United States Patent
Nam et al.

(10) Patent No.: US 7,436,473 B2
(45) Date of Patent: Oct. 14, 2008

(54) LIQUID CRYSTAL DISPLAY AND MANUFACTURING METHOD THEREOF

(75) Inventors: Hyo-Hak Nam, Suwon (KR); Dong-Gyu Kim, Yongin (KR); Dong-Won Lee, Cheonan (KR); Jung-Tae Kang, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 313 days.

(21) Appl. No.: 10/723,178

(22) Filed: Nov. 26, 2003

(65) Prior Publication Data

US 2004/0135941 A1 Jul. 15, 2004

(30) Foreign Application Priority Data

| Nov. 27, 2002 | (KR) | 10-2002-0074477 |
| Dec. 6, 2002 | (KR) | 10-2002-0077305 |
| Jul. 18, 2003 | (KR) | 10-2003-0049025 |

(51) Int. Cl.
*G02F 1/1333* (2006.01)

(52) U.S. Cl. ............. 349/110; 349/149; 349/152; 349/153; 349/187; 349/190

(58) Field of Classification Search ............. 349/110, 349/39, 38, 187, 153, 190, 154, 149–152
See application file for complete search history.

(56) References Cited

U.S. PATENT DOCUMENTS

| 5,739,880 A | | 4/1998 | Suzuki et al. | |
| 6,079,840 A | | 6/2000 | Ono et al. | |
| 6,099,672 A | * | 8/2000 | Yamazaki et al. | 156/109 |
| 6,330,044 B1 | * | 12/2001 | Murade | 349/44 |
| 6,771,348 B2 | * | 8/2004 | Oh et al. | 349/152 |
| 6,816,208 B2 | * | 11/2004 | Fukami et al. | 349/39 |
| 6,835,896 B2 | * | 12/2004 | Hwang et al. | 174/255 |
| 6,859,247 B2 | * | 2/2005 | Murade et al. | 349/139 |
| 2001/0026345 A1 | * | 10/2001 | Park et al. | 349/149 |
| 2001/0048502 A1 | * | 12/2001 | Moon et al. | 349/153 |
| 2002/0051110 A1 | * | 5/2002 | Kim | 349/149 |
| 2002/0167634 A1 | * | 11/2002 | Watanabe et al. | 349/153 |
| 2002/0196393 A1 | * | 12/2002 | Tashiro et al. | 349/106 |
| 2003/0038913 A1 | * | 2/2003 | Choo | 349/149 |
| 2003/0067428 A1 | * | 4/2003 | Moon | 345/87 |

(Continued)

FOREIGN PATENT DOCUMENTS

JP 10-142632 5/1998

(Continued)

*Primary Examiner*—David C. Nelms
*Assistant Examiner*—Thanh-Nhan P Nguyen
(74) *Attorney, Agent, or Firm*—F. Chau & Associates, LLC

(57) ABSTRACT

A liquid crystal display is provided, which includes: a panel assembly including a first panel provided with a first electrode, a second panel facing the first panel and provided with a second electrode, and a liquid crystal layer interposed between the first panel and the second panel, the panel assembly partitioned into a display area displaying images and a peripheral area located around the display area; a polarizer disposed on a first surface of the panel assembly; a first light blocking member disposed on the first surface of the panel assembly; and a second light blocking member facing an interposing area between the polarizer and the first light blocking member.

26 Claims, 19 Drawing Sheets

U.S. PATENT DOCUMENTS

| | | | |
|---|---|---|---|
| 2003/0117567 A1* | 6/2003 | Jung et al. | 349/149 |
| 2003/0218713 A1* | 11/2003 | Suzuki et al. | 349/156 |
| 2004/0125308 A1* | 7/2004 | Park et al. | 349/149 |
| 2004/0125315 A1* | 7/2004 | Park et al. | 349/153 |
| 2005/0036086 A1* | 2/2005 | Kim et al. | 349/106 |
| 2005/0151920 A1* | 7/2005 | Watanabe et al. | 349/153 |

FOREIGN PATENT DOCUMENTS

JP        2002-090719        3/2002

\* cited by examiner

LIQUID CRYSTAL DISPLAY AND MANUFACTURING METHOD THEREOF

BACKGROUND OF THE INVENTION (a) Field of the Invention

The present invention relates to a liquid crystal display and a manufacturing method thereof.

(b) Description of the Related Art

Generally, a liquid crystal display (LCD) includes a first panel provided with pixel electrodes and thin film transistors (TFTs), a second panel provided with a common electrode and color filters, and a liquid crystal layer interposed between the two panels. The LCD generates an electric field in the liquid crystal layer by voltage difference between the pixel electrodes and the common electrode and it varies the voltage difference to control orientations of liquid crystal molecules in the liquid crystal layer, which determine the polarization of light passing through the liquid crystal layer. The LCD converts the polarization of the light into the transmittance of the light by using polarizers, thereby displaying images.

The liquid crystal layer is usually formed by two technologies, vacuum injection and drop filling. The vacuum injection combines two panels with a sealant with a liquid crystal inlet and then fills the liquid crystal in a gap between the two panels through the inlet. The drop filling prints a sealant on a panel, drops the liquid crystal, and assembling the two panels with the sealant.

The drop filling employs a UV (ultra-violet) curable sealant for preventing the deterioration of the liquid crystal. However, the black matrix on the second panel or metal members such as signal wires on the first panel may block the UV ray for curing the sealant such that the sealant may not perfectly hardened.

Although it is suggested to narrow the black matrix for enhancing the hardening of the sealant, the decrease of the area of the black matrix may cause light leakage near a peripheral area of the LCD.

SUMMARY OF THE INVENTION

A motivation of the present invention is to solve the above-described problems of the conventional LCD.

According to another aspect of the present invention, a liquid crystal display is provided, which includes: a panel assembly including a first panel provided with a first electrode, a second panel facing the first panel and provided with a second electrode, and a liquid crystal layer interposed between the first panel and the second panel, the panel assembly partitioned into a display area displaying images and a peripheral area located around the display area; a polarizer disposed on a first surface of the panel assembly; a first light blocking member disposed on the first surface of the panel assembly; and a second light blocking member facing an interposing area between the polarizer and the first light blocking member.

The liquid crystal display may further includes a backlight unit disposed opposite the panel assembly with respect to the polarizer for supplying light to the panel assembly and including a lamp emitting the light and a plurality of optical sheets for processing the light from the lamp, the first light blocking member blocking light incident on the peripheral area.

The optical sheets preferably includes: a light spreading sheet for spreading the light; at least one prism sheet for condensing the spread light; and a protection sheet provided on the at least one prism sheet for protecting the at least one prism sheet.

Preferably, the second light blocking member is preferably incorporated into one of the optical sheets, and particularly into the protection sheet, and it is located near an edge of the protection sheet and the protection sheet includes a transparent portion.

The second light blocking member preferably has a width larger than the interposing area.

It is preferable that the liquid crystal display further includes a light curable adhesive disposed between the first panel and the second panel for combining the first and the second panels.

The second panel preferably includes a plurality of color filters; and a black matrix disposed between the color filters and overlapping the adhesive such that the light passing through the second panel is directed to the adhesive.

The first light blocking member may include a black adhesive tape.

According to another aspect of the present invention, a liquid crystal display is provided, which includes: a panel assembly including a first panel provided with a first electrode, a second panel facing the first panel and provided with a second electrode, and a liquid crystal layer interposed between the first panel and the second panel, the panel assembly partitioned into a display area displaying images and a peripheral area located around the display area; a polarizer disposed on the display area and the peripheral area of a first surface of the panel assembly for supplying a polarized light to the panel assembly; and a plurality of optical sheets disposed opposite the panel assembly with respect to the polarizer for processing light from a lamp to be supplied to the polarizer, at least one of the optical sheets including a light blocking area for blocking light incident on the peripheral area.

The optical sheets may includes a light spreading sheet for spreading the light; at least one prism sheet for condensing the spread light; and a protection sheet provided on the at least one prism sheet for protecting the at least one prism sheet.

The light blocking area of the protection sheet may be black-colored and located near an edge of the protection sheet.

The liquid crystal display may further include a light-curable adhesive disposed between the first panel and the second panel for combining the first and the second panels.

The second panel preferably includes: a plurality of color filters; and a black matrix disposed between the color filters and overlapping the adhesive such that the light passing through the second panel is directed to the adhesive.

Preferably, the light blocking area overlaps the black matrix.

According to another aspect of the present invention, a liquid crystal display is provided, which includes: a first panel including a conductive member including a light transmitting portion; a second panel spaced apart from the first panel by a predetermined gap and including a black matrix; a sealant disposed between the first panel and the second panel and overlapping the black matrix, the light transmitting portion disposed at the overlapping; and a liquid crystal layer filled in the gap between the first panel and the second panel, and enclosed by the sealant.

The light transmitting portion includes at least one transparent area and at least one opaque area. The at least transparent area is an opening type or a transparent conductive film. The at least transparent area may include a plurality of slits or a lattice pattern.

The at least transparent area preferably occupies about 20% or more of an area occupied by the light transmitting portion.

It is preferable that the first panel further includes a plurality of pixel electrodes and a plurality of storage electrode lines overlapping the pixel electrodes, and the conductive member includes a storage electrode connection connected to the storage electrode lines and overlapping the sealant and the black matrix.

It is preferable that the second panel further includes a common electrode, and the conductive member includes a common electrode connection connected to the common electrode and overlapping the sealant and the black matrix.

The liquid crystal display may further include a gate PCB and a data PCB for supplying signals to the first and the second panels, wherein the conductive member includes a connector transmitting signals between the data PCB and the gate PCB and overlapping the sealant and the black matrix.

The liquid crystal display may further include a gate driver, wherein the first panel further includes a plurality of thin film transistors controlled by the gate driver and the conductive member includes a signal line for signal transmission with the gate driver and overlapping the sealant and the black matrix.

The liquid crystal display may further include a data driver, wherein the first panel further includes a plurality of pixel electrodes supplied with voltages from the data driver and the conductive member includes a signal line for signal transmission with the data driver and overlapping the sealant and the black matrix.

The liquid crystal display may further include a data driver for generating data voltages; a gate driver for generating gate signals; and a data PCB and a gate PCB for controlling the data driver and the gate driver, wherein the first panel further includes a plurality of pixel electrodes and a plurality of thin film transistors for transmitting the data voltages to the pixel electrodes in response to the gate signals, the conductive member includes a connector for signal transmission between the data PCB and the gate PCB, a first signal line for signal transmission with the gate driver, and a second signal line for signal transmission with the data driver, and the connector and the first and the second signal lines are located out of the sealant.

The second panel may include a common electrode and the conductive member includes a common electrode connection connected to the common electrode and located out of the sealant.

A method of manufacturing a liquid crystal display is also provided, which includes: forming a conductive member including a light transmissive portion on a first substrate; forming a black matrix on a second substrate; forming a sealant overlapping the light transmissive portion; forming a liquid crystal layer enclosed by the sealant; adhering the second substrate to the first substrate using the sealant; and hardening the sealant to combine the first substrate and the second substrate.

The sealant preferably overlaps the black matrix in part.

The hardening may include: disposing a reflector located opposite the second substrate with respect to the first substrate; and directing light from the second substrate to the sealant to be hardened. It is preferable that the light is obliquely directed to the first and the second substrates.

The hardening includes: directing light from the first and the second substrates to the sealant to be hardened.

The hardening includes: directing light from the first substrate to the sealant to be hardened.

The method of claim 35, wherein the hardening further includes: reversing relative positions of the first and the second substrates before the direction of light.

According to another aspect of the present invention, a liquid crystal display is provided, which includes: a first panel including a conductive layer; a second panel spaced apart from the first panel by a predetermined gap and including a black matrix;

a sealant disposed between the first panel and the second panel and overlapping the black matrix; and a liquid crystal layer filled in the gap between the first panel and the second panel and enclosed by the sealant, wherein the conductive layer has a plurality of slits located at the overlapping and elongated along a signal transmission of the conductive layer.

The conductive layer preferably extends along the signal transmission.

The slits may form at least two rows along the signal transmission.

Preferably, width of the slits is equal to or larger than distance between the slits.

BRIEF DESCRIPTION OF THE DRAWINGS

The present invention will become more apparent by describing embodiments thereof in detail with reference to the accompanying drawings in which.

DETAILED DESCRITPION OF EMBODIMENTS

Figure 1:
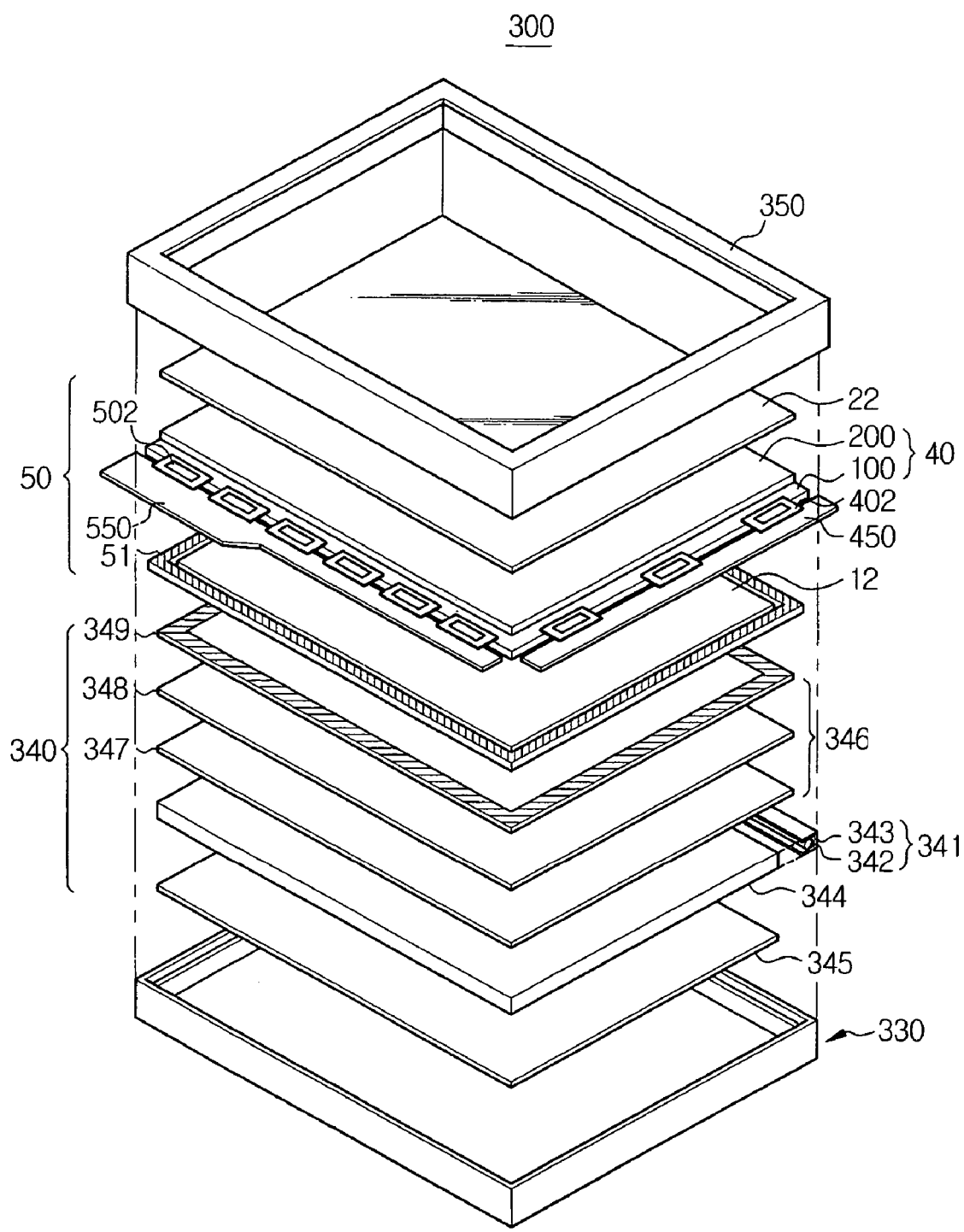
FIG. 1 is an exploded perspective view of an LCD according to an embodiment of the present invention.

The present invention now will be described more fully hereinafter with reference to the accompanying drawings, in which embodiments of the invention are shown. This invention may, however, be embodied in many different forms and should not be construed as limited to the embodiments set forth herein.

In the drawings, the thickness of layers and regions are exaggerated for clarity. Like numerals refer to like elements throughout. It will be understood that when an element such as a layer, film, region, substrate or panel is referred to as being "on" another element, it can be directly on the other element or intervening elements may also be present. In contrast, when an element is referred to as being "directly on" another element, there are no intervening elements present.

Then, liquid crystal displays and manufacturing methods thereof according to embodiments of the present invention will be described with reference to the drawings.

Figure 2:
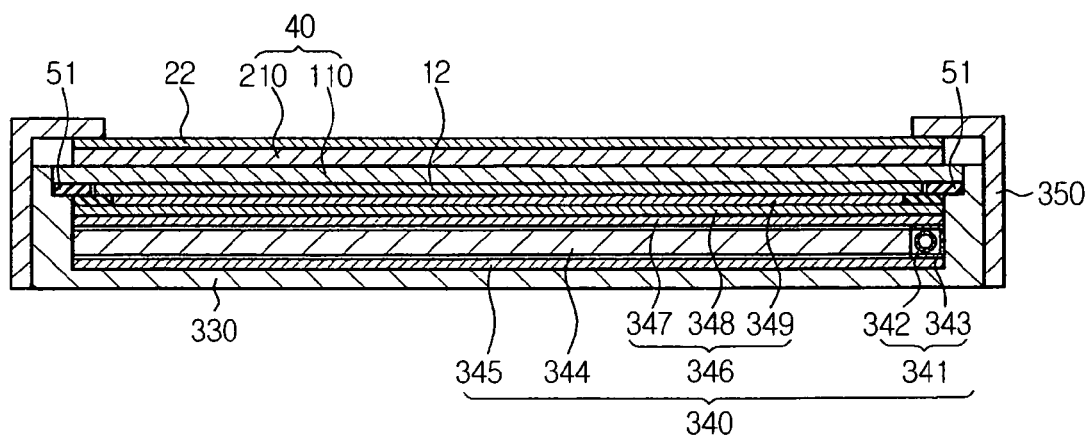
FIG. 2 is a sectional view of the LCD shown in FIG. 1.

FIG. 1 is an exploded perspective view of an LCD according to an embodiment of the present invention and FIG. 2 is a sectional view of the LCD shown in FIG. 1.

Referring to FIGS. 1 and 2, an LCD 300 according to an embodiment of the present invention includes a display unit 50 for displaying images, a backlight unit 340 for supplying light to the display unit 50, and a plurality of cases 330 and 350 for receiving the display unit 50 and the backlight unit 340.

The display unit 50 includes a liquid crystal panel assembly 40 displaying images and at least one printed circuit board (PCB) for driving the liquid crystal panel assembly 40. The liquid crystal panel assembly 40 includes a TFT array panel 100, a color filter array panel 200 facing the TFT array panel 100, and a liquid crystal layer (not shown) interposed between the TFT array panel 100 and the color filter array panel 200.

The TFT array panel 100 includes a first substrate preferably made of glass, a plurality of data lines (not shown) provided on the first substrate and extending in a first direction, a plurality of gate lines (not shown) provided on the first substrate and extending in a second direction perpendicular to the first direction, and a plurality of thin film transistors (TFTs) (not shown) connected to one of the data lines and one of the gate lines, and a plurality of pixel electrodes (not shown) connected to the TFTs and arranged in a matrix.

The color filter array panel 200 includes a second substrate preferably made of glass, a plurality of color filters (not shown) provided on the second substrate and representing primary colors such as red, green and blue, a black matrix (not shown) provided between the color filters, and a common electrode (not shown) provided on the color filters and the black matrix.

The TFT array panel 100 and the color filter array panel 200 are aligned and assembled such that the pixel electrodes and the color filters face each other. Thereafter, the liquid crystal layer is filled in a gap between the TFT array panel 100 and the color filter array panel 200, thereby completing the liquid crystal panel assembly 40.

The PCBs includes a data PCB 550 supplying image signals to the data lines and a gate PCB 450 supplying signals for driving the gate lines. The data PCB 550 is electrically connected to the data lines through a plurality of data tape carrier packages (TCPs) 502, while the gate PCB 450 is electrically connected to the gate lines through a plurality of TCPs 402.

In detail, one end portions of the data TCPs 502 are coupled with the data PCB 550, while opposite end portions of the data TCPs 502 are attached to data portions of the TFT array panel 100 where pad portions of the data lines are provided. Similarly, one end portions of the gate TCPs 402 are coupled with the gate PCB 450, while opposite end portions of the gate TCPs 402 are attached to gate portions of the TFT array panel 100 where pad portions of the gate lines are provided.

The display unit 50 further includes first and second polarizers 12 and 22 attached to outer surfaces of the liquid crystal panel assembly 40. In detail, the first polarizer 12 is located on a first area of one surface of the TFT array panel 100, and the second polarizer 22 are located on the color filter array panel 200.

The first polarizer 12 linearly polarizes an incident light emitted from the backlight unit 340 to the liquid crystal panel assembly 40 and provides the polarized light for the liquid crystal panel assembly 40, and the second polarizer 22 linearly polarizes an outgoing light from the liquid crystal panel assembly 40. The polarization axes of the first polarizer 12 and the second polarizer 22 are crossed.

A light blocking tape 51 is attached to a second area of the one surface of the TFT array panel 100. The light blocking tape 51 has a black color such that it blocks the light incident on the second area of the TFT array panel 100. The light blocking tape 51 is provided on the same layer as the first polarizer and encloses edges of the first polarizer 12. However, the blocking tape 51 does not overlap the first polarizer 12.

Although it is preferable that there is no gap between the light blocking tape 51 and the first polarizer 12, a third area (TA shown in FIG. 6) generating light leakage may be made due to manufacturing margin between the light blocking tape 51 and the first polarizer 12. The backlight unit 340 according to this embodiment includes a scheme for blocking the light passing through the third area TA, which will be described later.

The backlight unit 340 includes a lamp unit 341 for light emission and a light guide 344 for guiding the light toward the liquid crystal panel assembly 40. The lamp unit 341 includes a lamp 342 emitting light and a light reflector 343 reflecting the light toward the light guide 344.

The light guide 344 has an outgoing surface, a reflecting surface facing the outgoing surface for reflecting the light toward the outgoing surface, and four lateral surfaces connected between the outgoing surface and the reflecting surface. Among the four lateral surfaces, one surface is provided with the lamp unit 341 thereon such that the light guide 344 is supplied with the light through the one surface. The incident light may directly go out through the outgoing surface or may go out after reflected by the reflecting surface.

A reflecting plate 345 for reflecting light leaked from the reflecting surface is provided under the light guide 344, thereby increasing the light efficiency of the backlight unit 340. In addition, a plurality of optical sheets 346 for improving the optical characteristics of the light outgoing from the outgoing surface are provided on the light guide 344.

The optical sheets 346 include a light spreading sheet 347, a prism sheet the prism sheet 348, and a protection sheet 349. The light spreading sheet 347 spreads the light going out from the outgoing surface to give uniform luminance distribution, thereby increasing the viewing angle of the LCD 300. The prism sheet 348 condenses the light spread by the light spreading sheet 347 for increasing front luminance of the LCD 300. Typically, the prism sheet 348 includes two sub-sheets provided with a plurality of prisms extending perpendicular to each other. The protection sheet 349 is provided on the prism sheet 348 to prevent the prisms of the prism sheet 348 from being deformed due to external impact.

Figure 3:
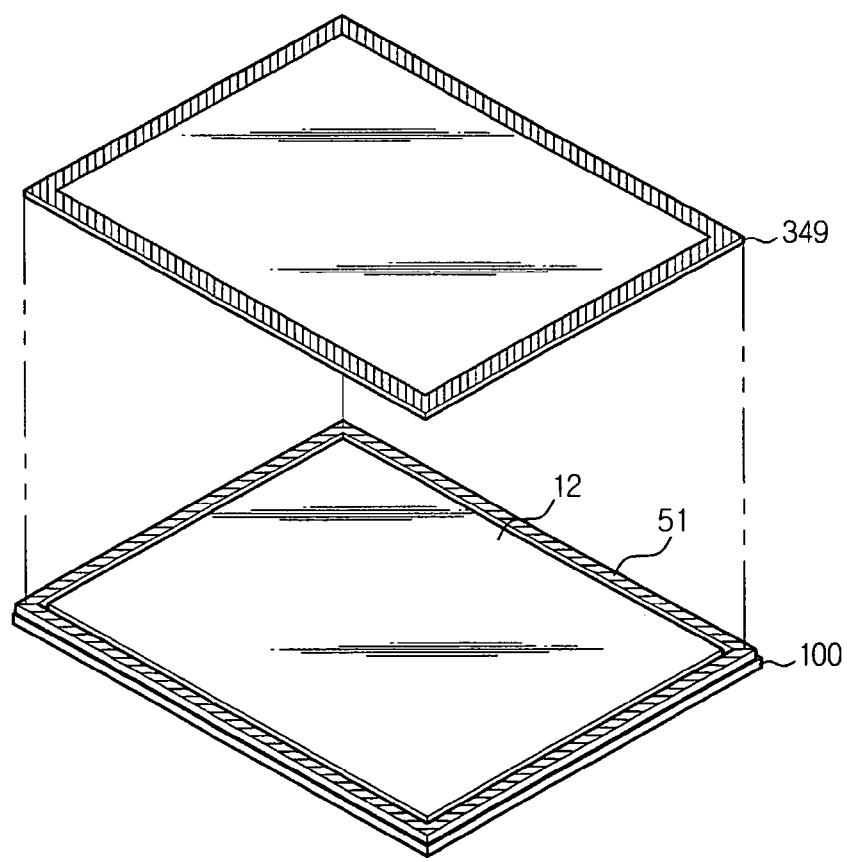
FIG. 3 is an exemplary perspective view of a display unit and a protection sheet shown in FIG. 1.

FIG. 3 is an exemplary perspective view of a display unit and a protection sheet shown in FIG. 1.

Referring to FIGS. 1-3 and 6, a protection sheet 349 has a light blocking area DA located near edges and formed by printing a black color. The light blocking area DA faces the third area TA, and a width w1 of the light blocking area DA is preferably larger than a width w2 of the third area TA.

The light blocking area DA blocks the light normally or obliquely incident on the third area TA, thereby preventing light leakage near boundaries between a display area Ds and a peripheral area Sr of the LCD 300.

Referring back to FIGS. 1 and 2, the cases include a mold frame 330 and a top chassis 350 receiving the display unit 50 and the backlight unit 340. The mold frame 330 has a receiving cavity defined by a bottom surface and lateral surfaces extending from the bottom surface, and the reflecting plate 345, the lamp unit 341, the light guide 344, and the optical sheets 346 are sequentially received in the cavity.

A step is formed on an upper portion of each lateral wall of the mold frame 330, where the display unit 50 is safely fixed. The PCBs 550 and 450 are placed on the back of the mold frame 330 via the TCPs 502 and 402.

After the display unit 50 and the backlight unit 340 are received in the mold frame 330, the top chassis 350 is combined with the mold frame 330, thereby completing the LCD 300.

Figure 4:
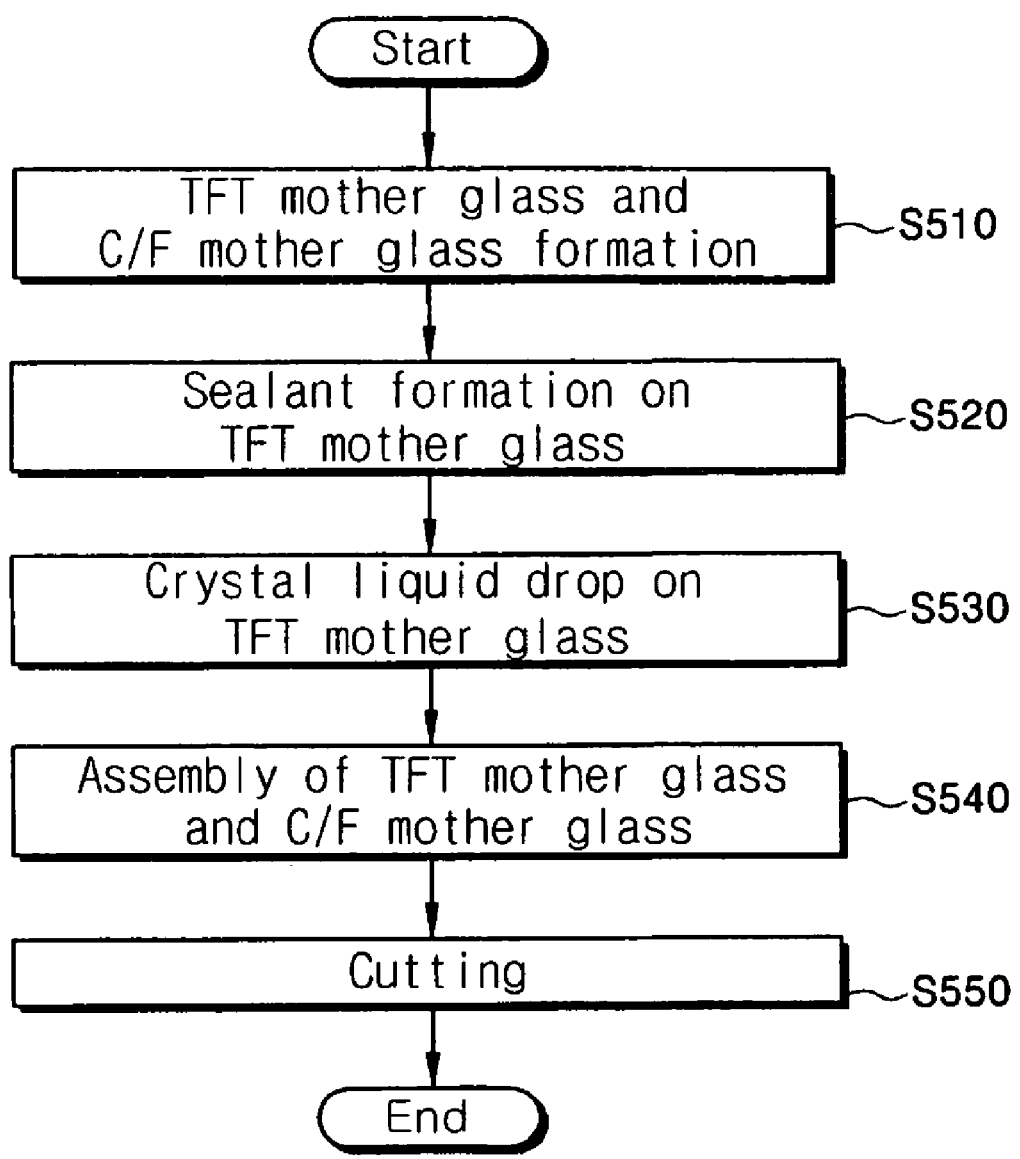
FIG. 4 is a flow chart illustrating a method of manufacturing an LCD shown in FIG. 1.

FIG. 4 is a flow chart illustrating a method of manufacturing an LCD shown in FIG. 1, and FIGS. 5A-5D are schematic diagrams illustrating the method shown in FIG. 4.

Figure 5A:
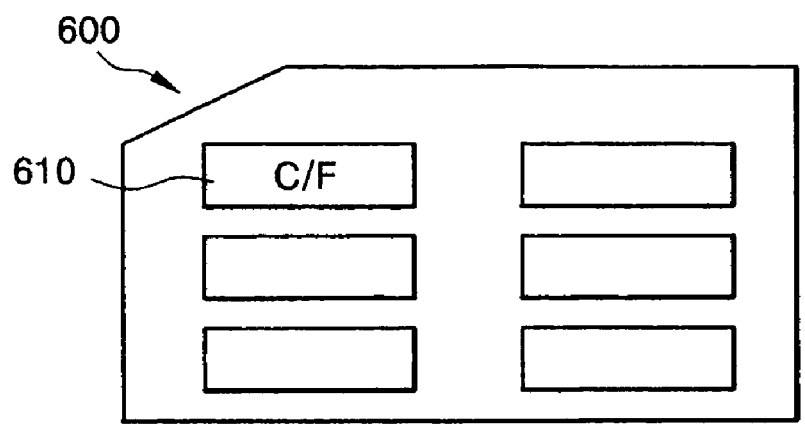
FIGS. 5A-5D are schematic diagrams illustrating the method shown in FIG. 4.
Figure 5A:
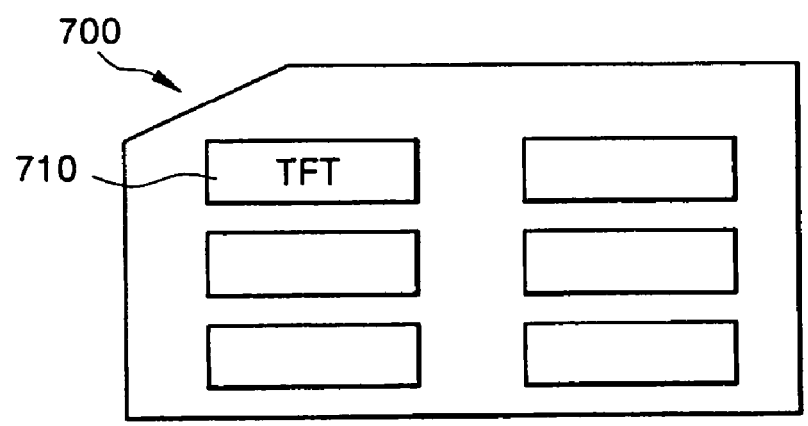

Referring to FIGS. 4 and 5A, a plurality of the TFT areas 710 including a plurality of TFTs (not shown) and a plurality of pixel electrodes (not shown) are formed on a TFT mother substrate 700 through a series of manufacturing steps. Similarly, a plurality of the C/F areas 610 are formed on a C/F mother substrate 600 (S510).

Figure 5B:
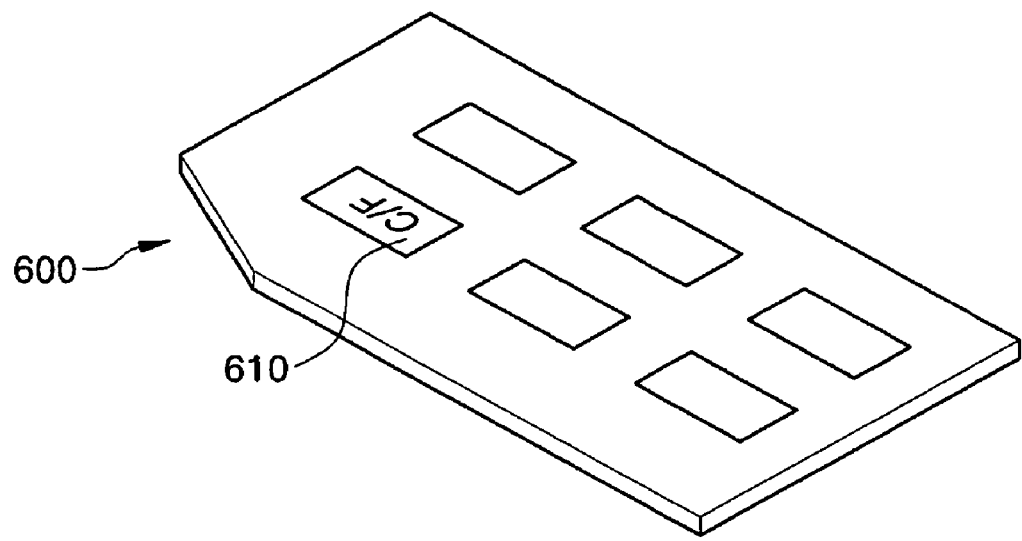
Figure 5B:
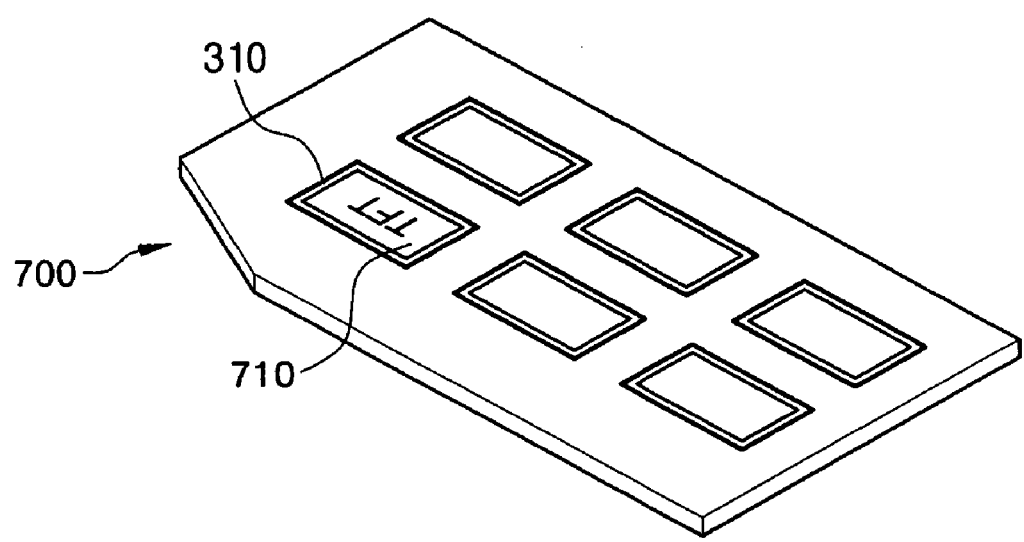

Referring to FIGS. 4 and 5B, a plurality of sealant 310 are formed on a plurality of seal line areas of the TFT mother substrate 700 (S520). The seal line areas are located on the peripheral areas of the TFT areas 710 of the TFT mother substrate 700. The sealant 310 supports a gap between the TFT mother substrate 700 and the C/F mother substrate 600 after they are combined.

Figure 5C:
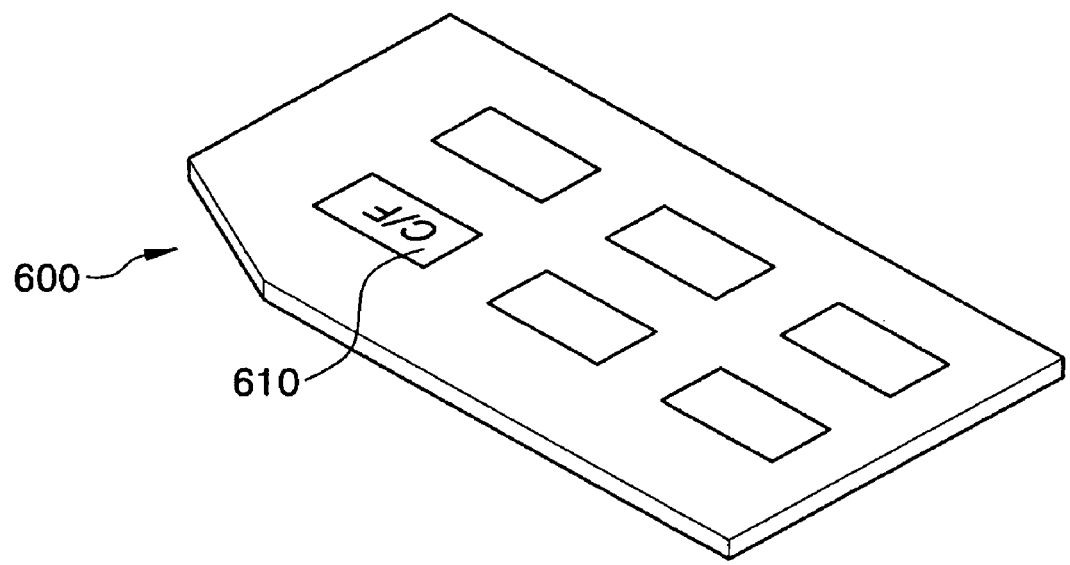
Figure 5C:
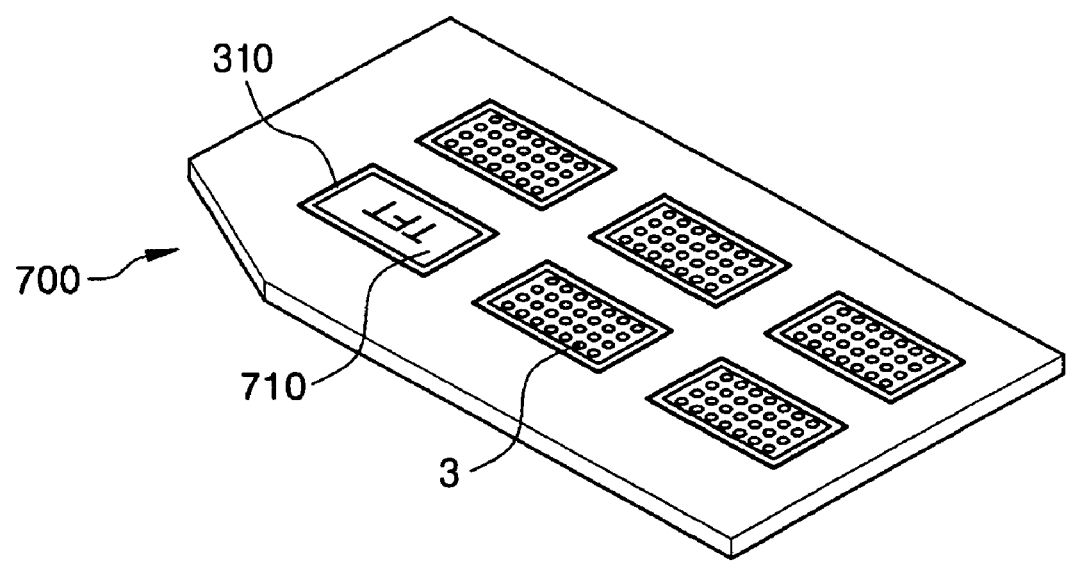

Referring to FIGS. 4 and 5C, liquid crystal 3 is dropped on the TFT areas 710 enclosed by the sealant 310 (S530).

Figure 5D:
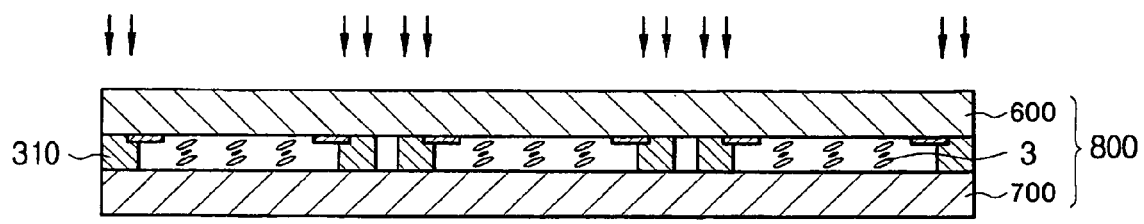

Referring to FIGS. 4 and 5D, after the TFT mother substrate 700 and the C/F mother substrate 600 are aligned opposite each other, the sealant 310 is exposed to light to be hardened such that the TFT mother substrate 700 and the C/F mother substrate 600 are assembled to form an assembly 800 provided with liquid crystal cells.

Since the sealant 310 is hardened with interposing the liquid crystal layer 3 between the TFT mother substrate 700 and the C/F mother substrate 600 in this drop filling technique, thermal hardening may deform the liquid crystal layer 3 and thus the dropping technique preferably employs light-curable sealant.

In detail, after the TFT mother substrate 700 and the C/F mother substrate 600 is aligned, the light is illuminated from the C/F mother substrate 600 to harden the sealant 310. Here, since the black matrix 220 on the C/F areas 610 of the C/F mother substrate 600 may block the hardening light, the overlapping between the black matrix 220 and the sealant 310 is preferably minimized.

Consequently, as shown in FIG. 4, the assembled substrates 800 are cut into the liquid crystal panel assemblies 40.

Figure 6:
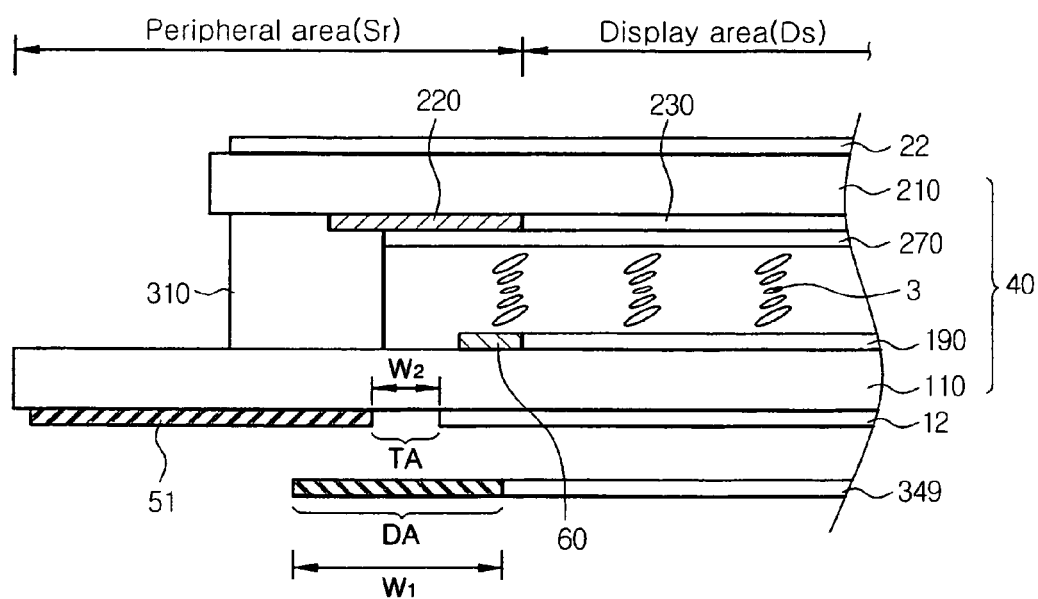
FIG. 6 is an enlarged sectional view of an LCD shown in FIG. 2.

FIG. 6 is an enlarged sectional view of an LCD shown in FIG. 2.

Referring to FIG. 6, a liquid crystal panel assembly 40 includes a TFT array panel 100, a color filter array panel 200, a liquid crystal layer 3 interposed between the TFT array panel 100 and the color filter array panel 200, and a sealant 310 for combining the TFT array panel 100 and the color filter array panel 200. The liquid crystal panel assembly 40 includes a display area Ds for displaying images and a peripheral area Sr located around the display area Ds.

The TFT array panel 100 includes a first substrate 110 preferably made of glass, a plurality of TFTs 60 formed on the first substrate 110, and a plurality of pixel electrodes 190 formed on the first substrate 110, connected to the TFTs 60 and arranged in a matrix. The color filter array panel 200 includes a second substrate 210 preferably made of glass, a plurality of color filters 230 provided on the second substrate 210 and representing primary colors such as red, green and blue, a black matrix 220 provided between the color filters 230, and a common electrode 270 provided on the color filters 230 and the black matrix 220.

A first polarizer 12 is attached on one surface of the TFT array panel 100, and a second polarizer 22 is attached on one surface of the color filter array panel 200. In detail, the first polarizer 12 is located mostly on the display area Ds and partly on the peripheral area Sr. In other words, the first polarizer 12 is located on a first area including the display area Ds and a portion of the peripheral area Sr.

A light blocking tape 51 is attached to a surface of the TFT array panel 100. The light blocking tape 51 is located on the peripheral area Sr such that it blocks the light incident on the peripheral area Sr. The black matrix 220 covers only a portion of the sealant 310 for complete hardening thereof. Accordingly, the light blocking tape 51 blocks the light incident on the peripheral area Sr to prevent light components, which do not contain image information, from being leaked into a display screen of the LCD 300 through the sealant 310.

The light blocking tape 51 preferably has a thickness equal to the first polarizer 12. When the light blocking tape 51 is thicker or thinner than the first polarizer 12, a plurality of optical sheets 346 of the backlight unit 340 located under the light blocking tape 51 and the first polarizer 12 may be wrinkled to deteriorate display quality and product quality of the LCD 300.

Since the wrinkling may be caused by the overlap of the first polarizer 12 and the light blocking tape 51, it is preferable that the first polarizer 12 and the light blocking tape 51 do not overlap each other.

In the meantime, the black matrix 220 overlaps the light blocking tape 51 when viewing from the backlight unit 340. The light blocking tape 51 having such a configuration blocks the light normally or obliquely incident on a surface of the TFT array panel 100, thereby preventing light leakage near boundaries between a display area Ds and a peripheral area Sr of the LCD 300. The above-described second area corresponds to the light blocking tape 51.

A third area TA is formed between the light blocking tape 51 and the first polarizer 12 due to manufacturing margin. The light passing through the third area TA i5 often leaked into a display surface of the LCD 300. To block the light incident on the third area, a light blocking area DA is provided near edges of the protection sheet 349.

The light blocking area DA is formed by printing a black color on the edge area of the protection sheet 340. A width w1 of the light blocking area DA is preferably larger than a width w2 of the third area TA such that the light blocking area DA blocks the light normally or obliquely incident on the third area TA, thereby preventing light leakage on the display surface of the LCD 300.

Although FIGS. 1-6 shows the light blocking area DA on the protection sheet 349, the light blocking area DA may be provided on the prism sheet 348 or the light spreading sheet 347.

Figure 7:
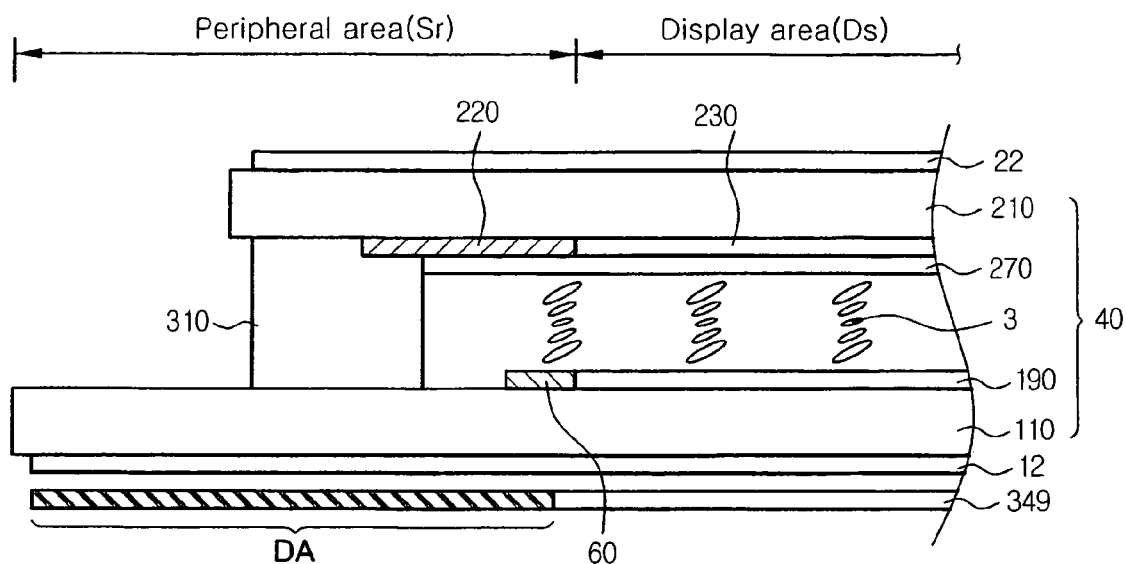
FIG. 7 is a sectional view of an LCD according to another embodiment of the present invention.

FIG. 7 is a sectional view of an LCD according to another embodiment of the present invention.

Referring to FIG. 7, an LCD 300 according to another embodiment of the present invention includes a liquid crystal panel assembly 40 including a TFT array panel 100, a color filter array panel 200, a liquid crystal layer 3 interposed between the TFT array panel 100 and the color filter array panel 200, and a sealant 310 for combining the TFT array panel 100 and the color filter array panel 200. The liquid crystal panel assembly 40 includes a display area Ds displaying images and a peripheral area Sr located around the display area Ds.

The TFT array panel 100 includes a first substrate 110 preferably made of glass, a plurality of TFTs 60 formed on the first substrate 110, and a plurality of pixel electrodes 190 formed on the first substrate 110, connected to the TFTs 60 and arranged in a matrix. The color filter array panel 200 includes a second substrate 210 preferably made of glass, a plurality of color filters 230 provided on the second substrate 210 and representing primary colors such as red, green and blue, a black matrix 220 provided between the color filters 230, and a common electrode 270 provided on the color filters 230 and the black matrix 220.

A first polarizer 12 is attached on one surface of the TFT array panel 100, and a second polarizer 22 is attached on one surface of the color filter array panel 200. In detail, the first polarizer 12 is located on the display area Ds as well as on the peripheral area Sr.

The LCD 300 further includes a backlight unit 340 located behind the liquid crystal panel assembly 40 for emitting light to be supplied to the liquid crystal panel assembly 40.

The backlight unit 340 includes a lamp unit 341 for light emission, a light guide 344 for guiding the light toward the liquid crystal panel assembly 40, a reflector 345 provided under the light guide 344, and a plurality of optical sheets 346 provided on the light guide 344.

The optical sheets 346 include a light spreading sheet 347, a prism sheet the prism sheet 348, and a protection sheet 349. The light spreading sheet 347 spreads the light going out from the outgoing surface to give uniform luminance distribution, thereby increasing the viewing angle of the LCD 300. The prism sheet 348 condenses the light spread by the light spreading sheet 347 for increasing front luminance of the LCD 300. The protection sheet 349 is provided on the prism sheet 348 to prevent the prisms of the prism sheet 348 from being deformed due to external impact. Edge areas of the protection sheet 349 corresponding to the peripheral area Sr is printed with a black color to form a light blocking area DA blocking the light incident on the peripheral area Sr of the liquid crystal panel assembly 40.

Since the light blocking area DA is incorporated into the protection sheet 349, the manufacturing error is reduced compared with a case using a light blocking tape 51 attached to a surface of the TFT array panel 100 independent of the first polarizer 12. Accordingly, the light leakage, which does not contain image information, near boundaries between the peripheral area Sr and the display area Ds is reduced.

Although FIG. 7 shows the light blocking area DA provided on the protection sheet 349, the light blocking area DA may be provided on the prism sheet 347 or the light spreading sheet 348.

Figure 8A:
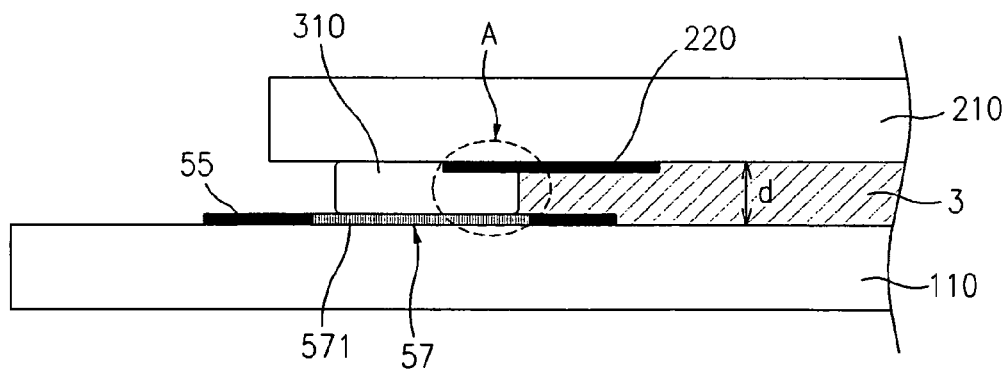
FIG. 8A is a schematic sectional view of an LCD according to another embodiment of the present invention.
Figure 8B:
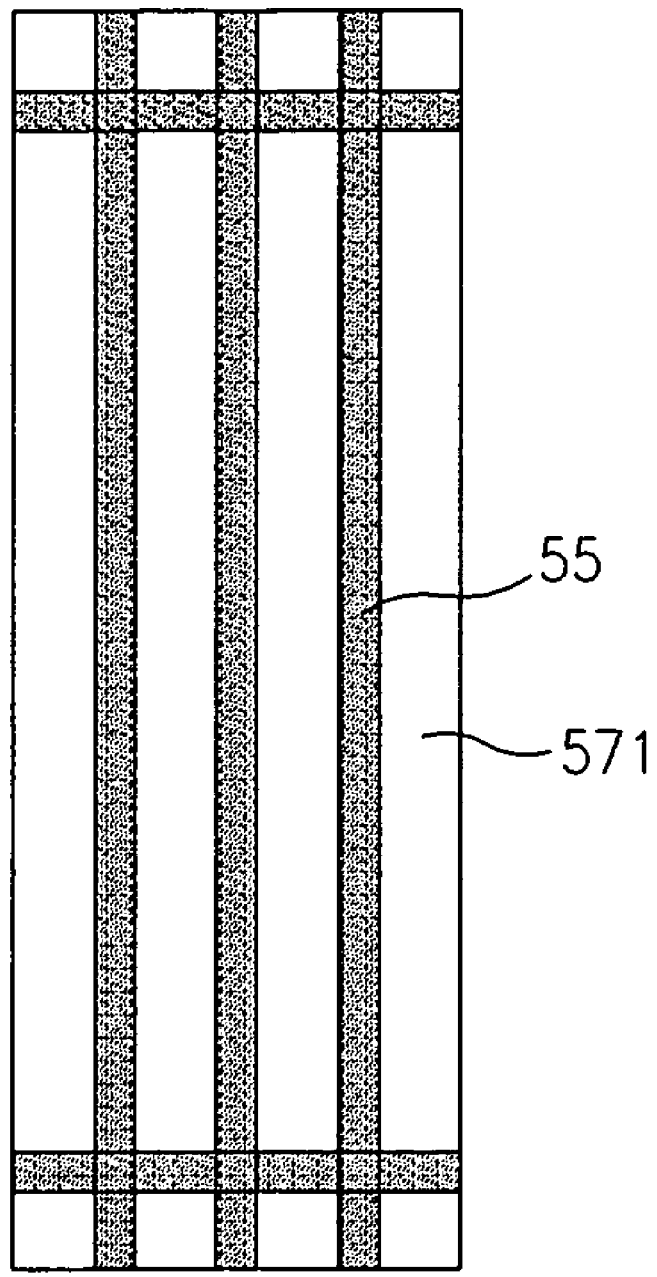
FIG. 8B is an exemplary layout view of a metal pattern of the LCD shown in FIG. 8A.

FIG. 8A is a schematic sectional view of an LCD according to another embodiment of the present invention, and FIG. 8B is an exemplary layout view of a metal pattern of the LCD shown in FIG. 8A.

Referring to FIG. 8A, an LCD according to another embodiment of the present invention includes first and second substrates 110 and 210 and a liquid crystal layer 3 interposed between the first substrate 110 and the second substrate 210.

A black matrix 220 forming a matrix for partitioning pixel areas is formed on the second substrate 210. The second substrate 210 is separated from the first substrate 110 by a predetermined gap. A metal pattern 55 including TFTs are formed on the first substrate 110. A sealant is formed between the first substrate 110 and the second substrate 210 near edges of the first and the second substrates 110 and 210. The sealant 310 seals the liquid crystal layer 3 filled in the gap between the first and the second substrates 110 and 210 and adheres the first and the second substrates 110 and 210.

The metal pattern 55 includes TFTs and several wires on the first substrate 110. Some portions of the metal pattern 55 overlap the sealant 310 and the black matrix 220 and the metal pattern 55 includes a light transmitting member 57 on the overlap A for transmitting UV light for hardening the sealant during a manufacturing process.

The light transmitting member 57 shown in FIG. 7 includes an opening portion 571. The opening portion 571 transmits UV light to harden the sealant 310.

Referring to FIGS. 8A and 8B, the opening portion 571 of the metal pattern 55 includes a plurality of elongated slits.

Preferably, the slit-shaped light transmitting member 57 occupies equal to or larger than about 20% of the metal pattern 55 of the first substrate 110 for desired hardening of the sealant 310.

The metal pattern 55 is preferably provided along all four edges of the first and the second substrates 110 and 210 for uniform cell gap d as well as for complete hardening of the sealant 310.

However, the provision of the light transmitting member 57 such as the opening portion 571 at the metal pattern 55 of the first substrate 110 increases the resistance of the metal pattern 55. Accordingly, it is preferably that the metal pattern 55 is made of low resistivity material or has a large thickness.

Various metal patterns 55 overlapping the sealant 310 and the black matrix 220 can be formed on the first substrate, which is described hereinafter.

Figure 9A:
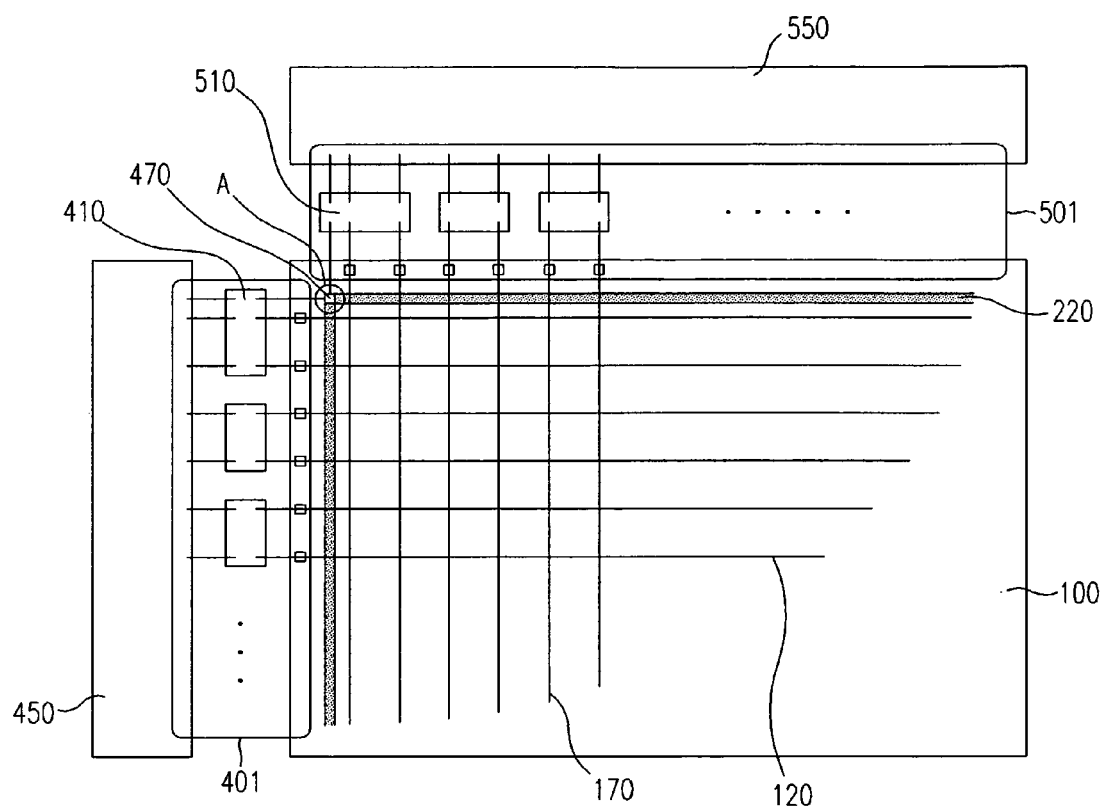
FIGS. 9A-9C are schematic plan views of metal patterns of an LCD according to another embodiment of the present invention.
Figure 9B:
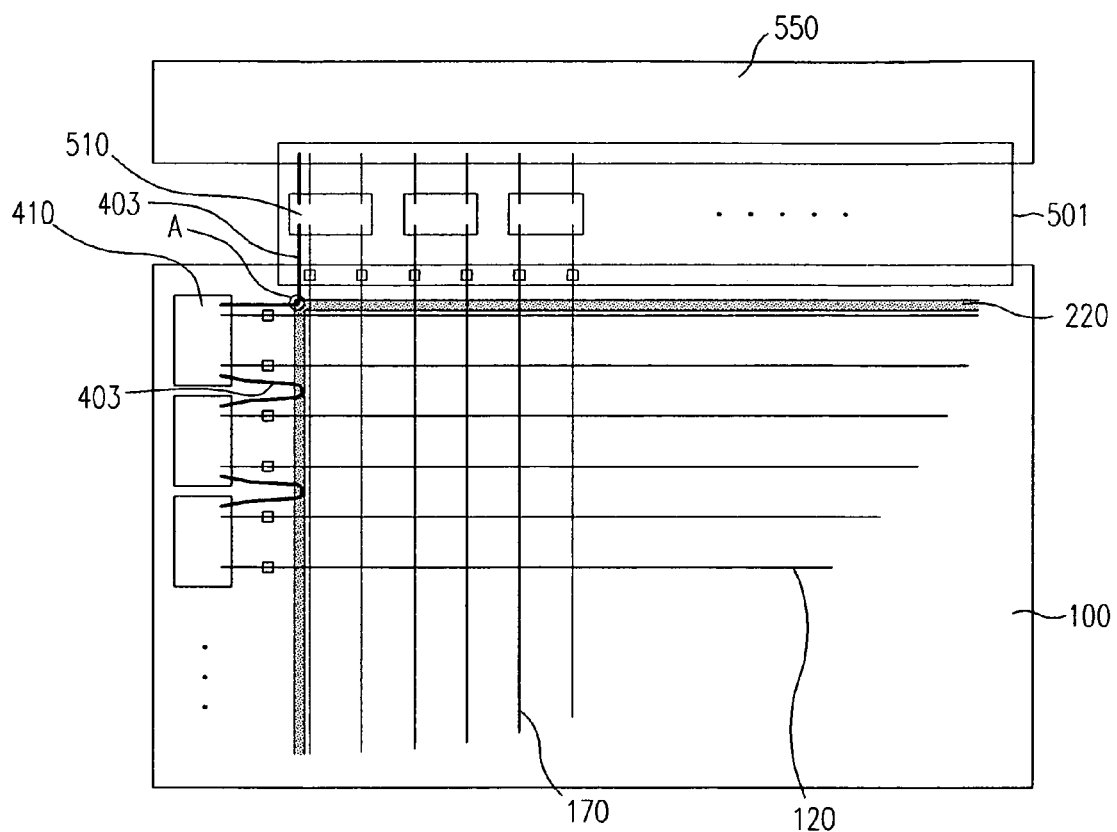
Figure 9C:
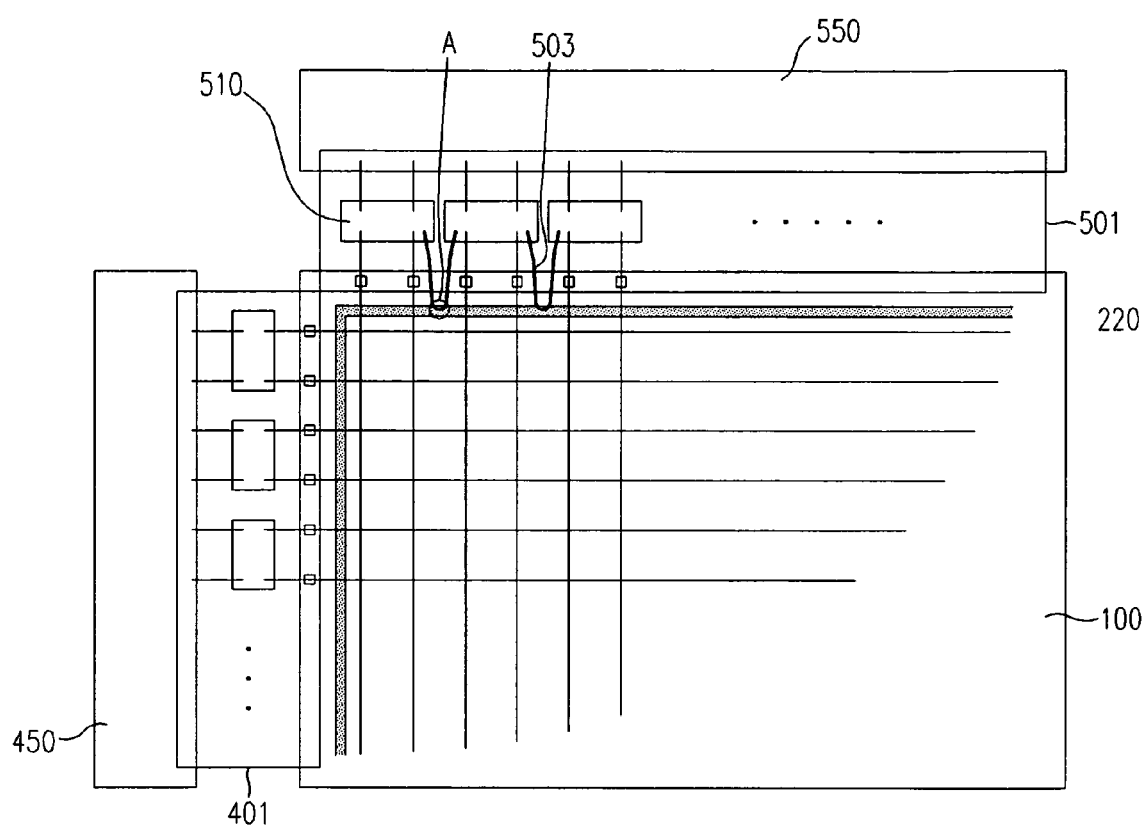

FIGS. 9A-9C are schematic plan views of metal patterns of an LCD according to another embodiment of the present invention.

Referring to FIGS. 9A-9C, an LCD according to another embodiment of the present invention includes a TFT array panel 100, a color filter array panel (not shown), a liquid crystal layer (not shown) for determining the transmittance of incident light based on electrical signals, and a sealant (not shown) for combining the panels. The TFT array panel 100 includes a plurality of pixel electrodes (not shown), a plurality of TFTs (not shown) connected to the pixel electrodes, a data wire 170 transmitting data voltages for displaying images to the TFTs, and a gate wire 120 transmitting gate signals for driving the TFTs. Dark areas in FIGS. 9A-9C represent overlapping of a black matrix 220 on the C/F array panel and the sealant.

The LCD further includes a gate driver 401 for generating the gate voltages, a data driver 501 generating the data voltages, a PCBs 450 and 550 for driving the gate driver 401 and the data driver 501. The gate driver 401 and the data driver 501 include a plurality of driving circuits 410 and 510, and FIGS. 9A-9C show various connections between the driving circuit 410 and 510 to the TFT array panel 100 and the PCBs 450 and 550.

The LCD shown in FIG. 9A places a connector 470 for transmitting signals from the data PCB 550 to the gate PCB 450 directly on the TFT array panel 100, and the connector 470 is located on the overlap A of the sealant 310 and the black matrix 220.

The LCD shown in FIG. 9B omits the gate PCB 450 compared with that shown in FIG. 9A, mounts the gate driving circuits 410 directly on the TFT array panel 100, and places a plurality of signal lines 403 for the gate driving circuits 410 on the TFT array panel 100. The signal lines 403 are located on the overlap A of the sealant 310 and the black matrix 220.

The LCD shown in FIG. 9C places a plurality of signal lines 503 connected between the data driving circuits 510 of the data driver 501 on the TFT array panel 100, and the signal lines 503 are located on the overlap A of the sealant 310 and the black matrix 220.

The connector 470 shown in FIG. 9A, the signal lines 403 shown in FIG. 9B, and the signal lines 503 shown in FIG. 9C have opening portions 571 (as that shown in FIG. 8A) on the overlap A between the black matrix 220 and the sealant 310 for transmitting UV light to harden the sealant 310.

Figure 10:
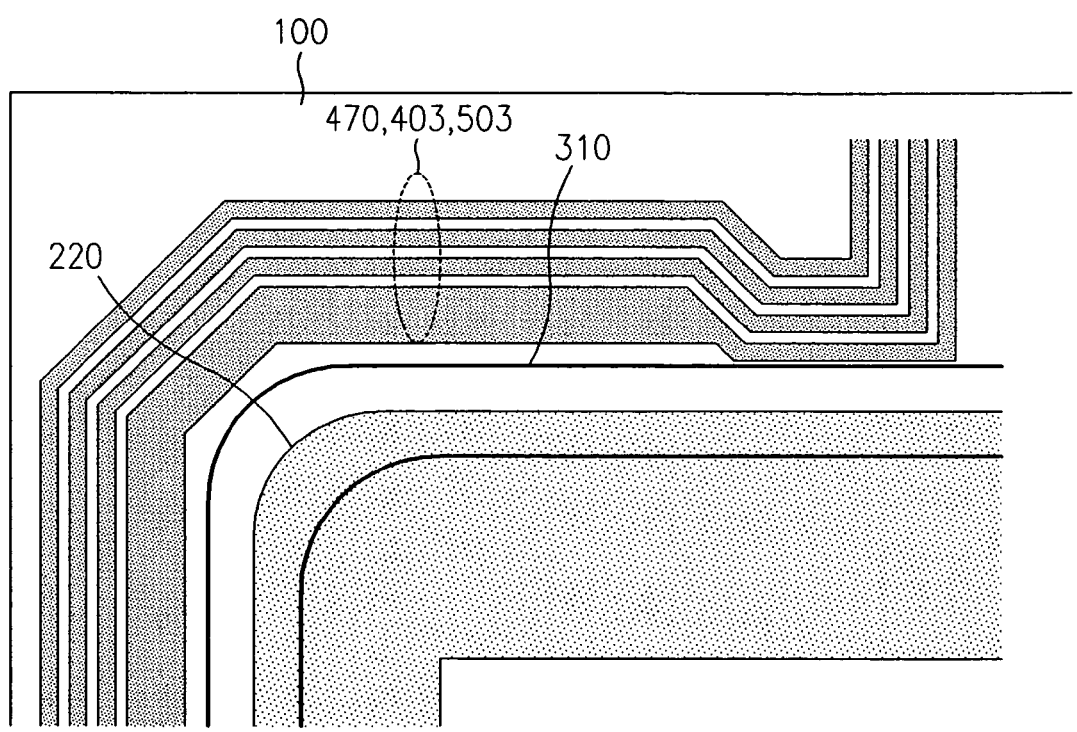
FIG. 10 is a partial layout view of an LCD according to another embodiment of the present invention.

FIG. 10 is a partial layout view of an LCD according to another embodiment of the present invention.

The LCD shown in FIG. 10 includes a connector 470, a plurality of signal lines 403 for gate driving circuits, and/or a plurality of signals 503 for data driving circuits, which are located out of a sealant 310. Since these metal members 470, 403 and 503 do not contribute to the blocking of UV light for hardening the sealant 310, the hardening of the sealant 310 is improved.

Figure 11:
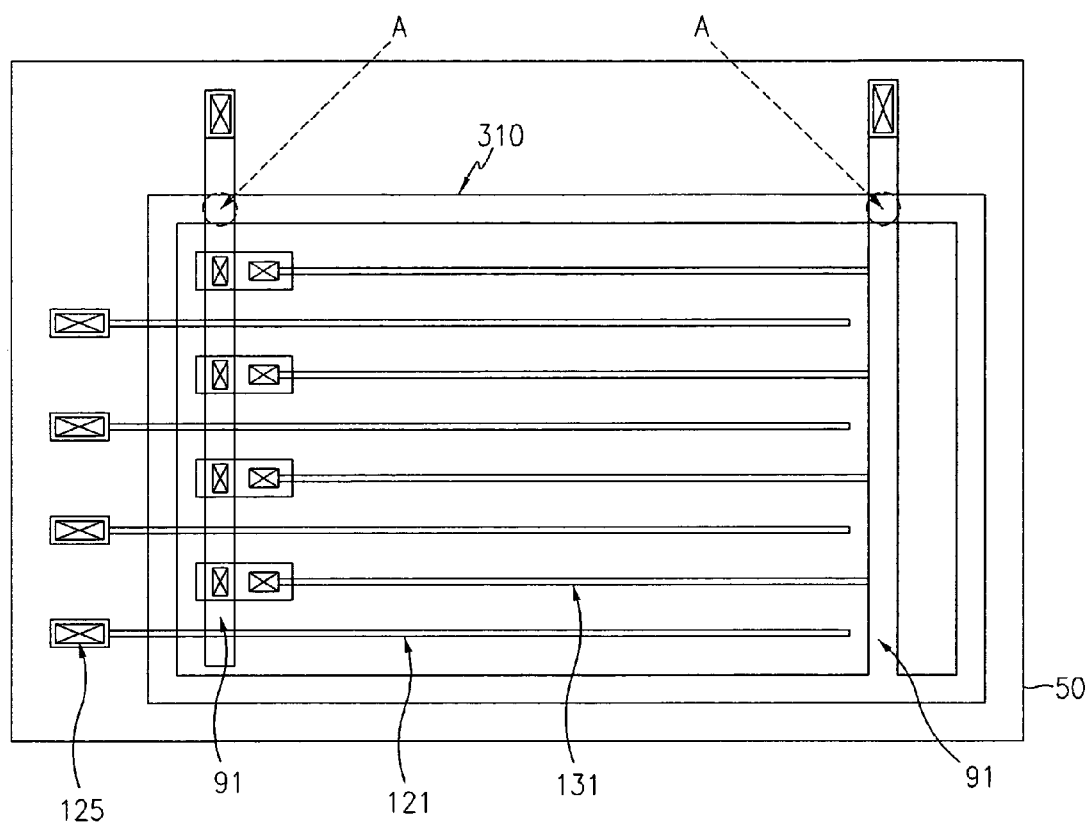
FIG. 11 is a schematic layout view of a TFT array panel according to another embodiment of the present invention.

FIG. 11 is a schematic layout view of a TFT array panel according to an embodiment of the present invention.

The TFT array panel 100 shown in FIG. 11 includes a first substrate, a plurality of pixel electrodes, a plurality of gate lines 121 having end portions 125, a plurality of storage electrode lines 131 extending parallel to the gate lines 121 and overlapping the pixel electrodes to form storage capacitors, and a pair of connecting bridges 91 for connecting the storage electrode lines 131 and including pads 135 for signal transmission. A sealant is formed on the TFT array panel 100 around edges thereof.

Since the connecting bridges 91 overlap the sealant 310, they have opening portions 571 on the overlap A between the black matrix 220 and the sealant 310 for transmitting UV light to harden the sealant 310.

According to another embodiment of the present invention, an LCD includes a common voltage connection for transmitting a common voltage from a first panel to a common electrode of a second panel facing the first panel. When the common voltage connection overlaps a sealant, the common voltage connection preferably has an opening portion located on an overlap between the sealant and a black matrix for transmitting UV light to harden the sealant 310. Alternatively, the common voltage connection is located out of the sealant 310.

Figure 12:
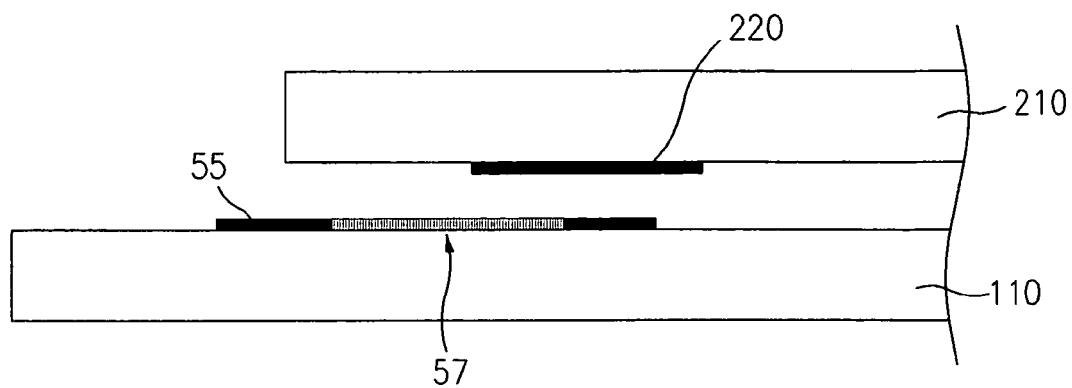
FIGS. 12 and 13 are sectional views illustrating a method of manufacturing an LCD according to an embodiment of the present invention.
Figure 13:
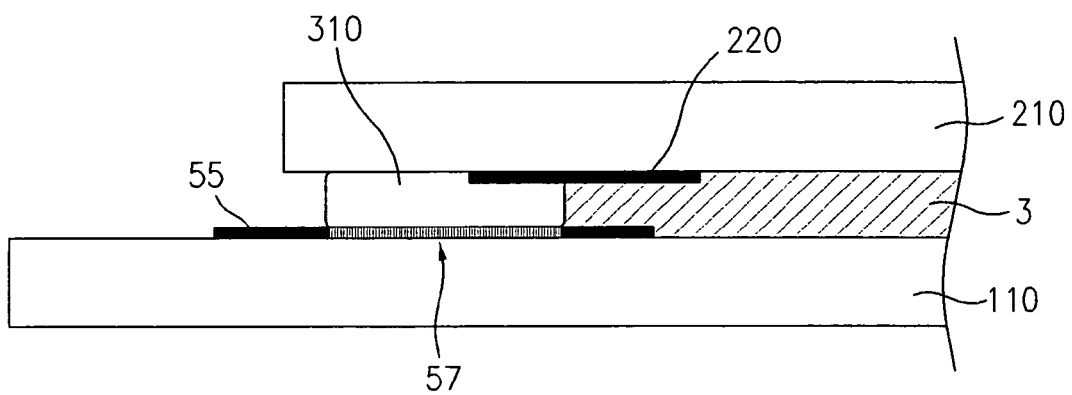
Figure 14A:
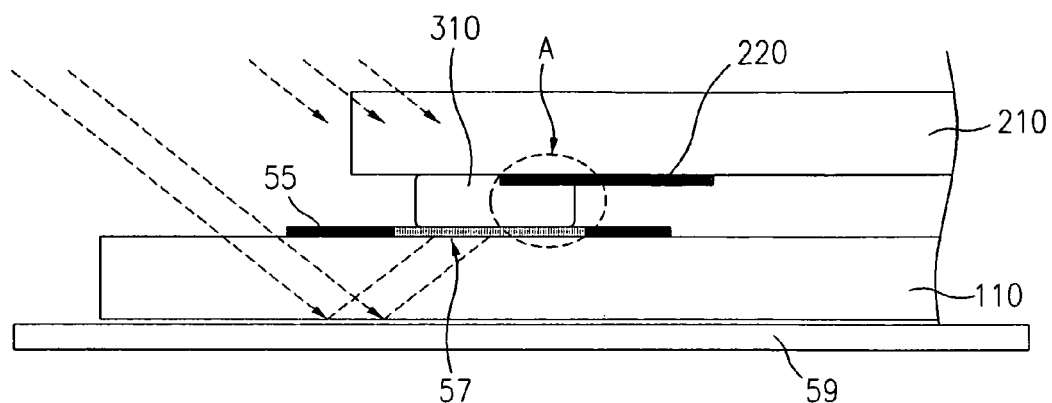
FIGS. 14A-14C shows various light illuminations for hardening a sealant according to embodiments of the present invention.
Figure 14B:
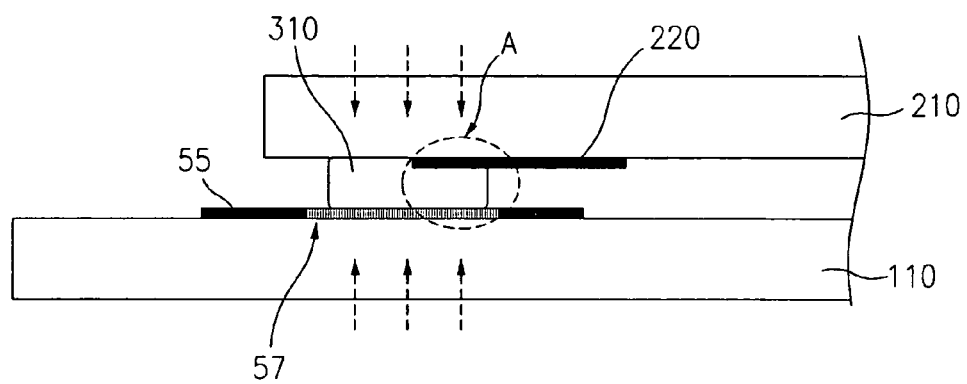
Figure 14C:
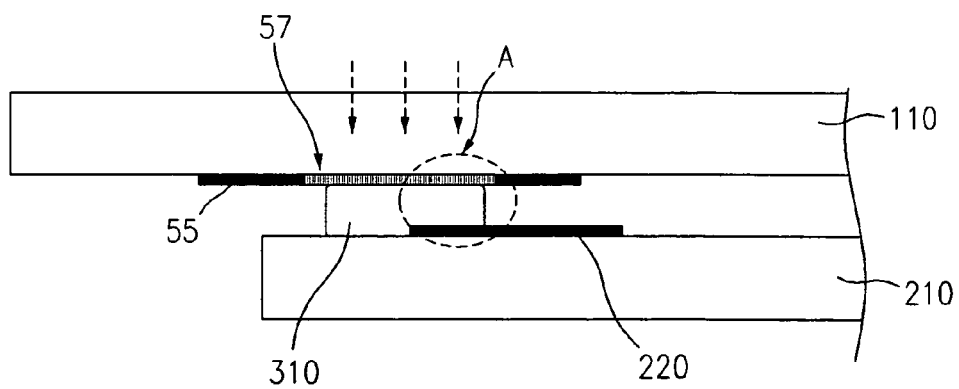

FIGS. 12 and 13 are sectional views illustrating a method of manufacturing an LCD according to an embodiment of the present invention, and FIGS. 14A-14C shows various light illuminations for hardening a sealant according to embodiments of the present invention.

Referring to FIG. 12, a black matrix 220 is formed on a second substrate 210. A plurality of color filters are formed on areas defined by the black matrix 220. A metal pattern 55 including a light transmitting member 57 is formed on a first substrate 110. The light transmitting member 57 is an opening portion in the metal pattern 55.

Referring to FIG. 13, a sealant 310 overlapping the light transmitting member 57 of the metal pattern 55 is formed on the first substrate 110 such that the sealant 310 overlaps the black matrix 220 in part. A liquid crystal layer 3 is formed in an area enclosed by the sealant 310. The first substrate 110 and the second substrate 210 are adhered to each other.

Referring to FIGS. 14A-14C, the sealant 310 disposed between the second substrate 0.210 and the first substrate 110 is hardened to combine the second substrate 210 and the first substrate 110.

An example shown in FIG. 14A exposes the sealant to UV light using a reflecting plate 59 disposed on an outer surface of the first substrate 110 to harden the sealant 310. In detail, the UV light is directed oblique to the normal of the substrates 110 and 120. Then, portions of the sealant, which are not covered by the black matrix 220 are directly exposed to the light, while an overlap A of the sealant 310 covered by the black matrix 220 is exposed to the light reflected by the reflecting plate 59 and passing through the light transmitting member 57 of the metal pattern 55.

According to an example shown in FIG. 14B, the UV light is directed from outer surfaces of both the first and the second substrates 110 and 210 to harden the sealant 310. Then, portions of the sealant, which are not covered by the black matrix 220 are exposed to the light directly or through the light transmitting member 57, while an overlap A of the sealant 310 covered by the black matrix 220 is exposed to the light through the light transmitting member 57.

An exemplary method shown in FIG. 14C directs the light from the outer surface of the first substrate 110 with or without reversing the substrates 110 and 210 to harden the sealant 310.

Figure 15:
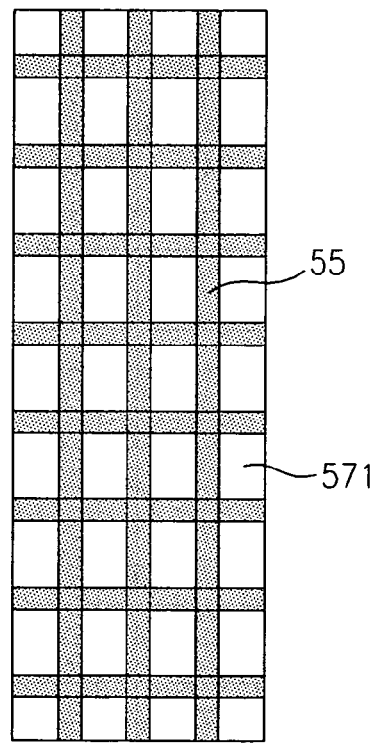
FIG. 15 shows an opening portion of a metal pattern of an LCD according to another embodiment of the present invention.

FIG. 15 shows an opening portion of a metal pattern of an LCD according to another embodiment of the present invention.

As shown in FIG. 15, the opening portion 571 of the metal pattern 55 has a lattice form. Alternatively, the opening portion 571 has no regular shape.

Figure 16:
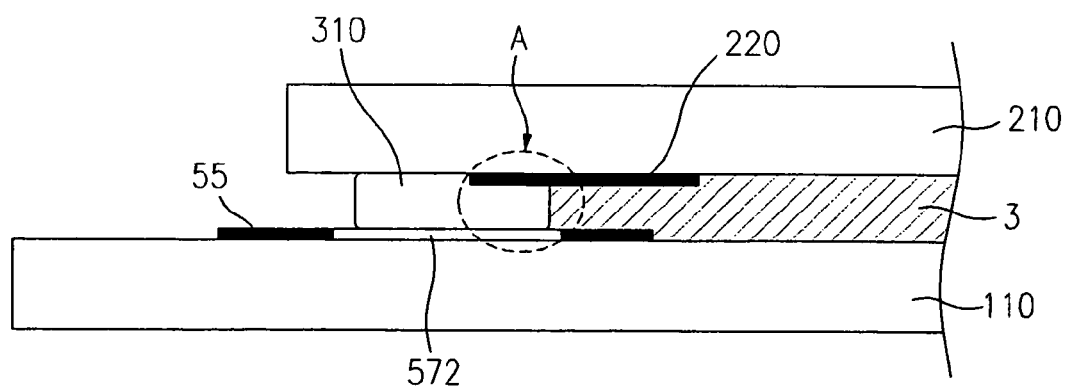
FIG. 16 is a sectional view of an LCD according to another embodiment of the present invention.

FIG. 16 is a sectional view of an LCD according to another embodiment of the present invention.

Referring to FIG. 16, a metal pattern 55 includes a light transmitting member made of a transparent conductive film 572 located at an overlap A between a sealant 310 and a black matrix 220.

Figure 17:
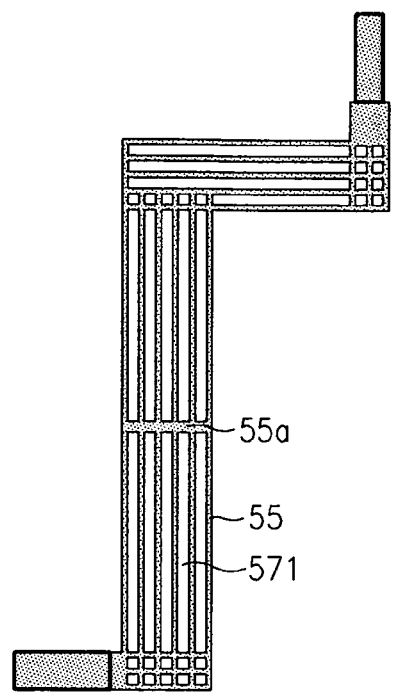
FIG. 17 shows an opening portion of a metal pattern of an LCD according to an embodiment of the present invention.

FIG. 17 shows an opening portion of a metal pattern of an LCD according to a fifth embodiment of the present invention.

Referring to FIGS. 8A and 17, an LCD according to a fifth embodiment of the present invention includes upper and lower substrates 210 and 110 and a liquid crystal layer 3 interposed therebetween.

A black matrix 220 forming a matrix for partitioning pixel areas is formed on the upper substrate 210. The upper substrate 210 is separated from the lower substrate 110 by a predetermined gap. A conductive layer 55 including TFTs are formed on the lower substrate 110. A sealant is formed between the lower substrate 110 and the upper substrate 210 near edges of the lower and the upper substrates 110 and 210. The sealant 310 seals the liquid crystal layer 3 filled in the gap between the lower and the upper substrates 110 and 210 and adheres the lower and the upper substrates 110 and 210.

Some portions of the conductive layer 55 including TFTs and several wires on the lower substrate 110 overlap the sealant 310 and the black matrix 220 and the conductive layer 55 includes an opening portion 571 on the overlap A for transmitting UV light for hardening the sealant during a manufacturing process.

In order to reduce the increased resistance of the conductive layer 55 due to the introduction of the opening portion 571, the opening portion 571 includes a plurality of long slits elongated along an extension direction of the conductive layer 55 as shown in FIG. 17, where the signals are transmitted the extension direction. The width of the slits is preferably equal to or larger than the spacing between the slits for sufficient transmission of the UV light.

Accordingly, the portions of the conductive layer 55 between the slits form a plurality of elongated narrow lines.

Figure 18:
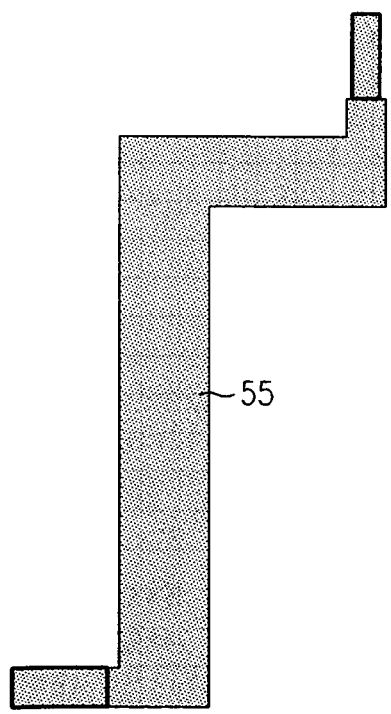
FIG. 18 shows a metal pattern of a conventional LCD.
Figure 19:
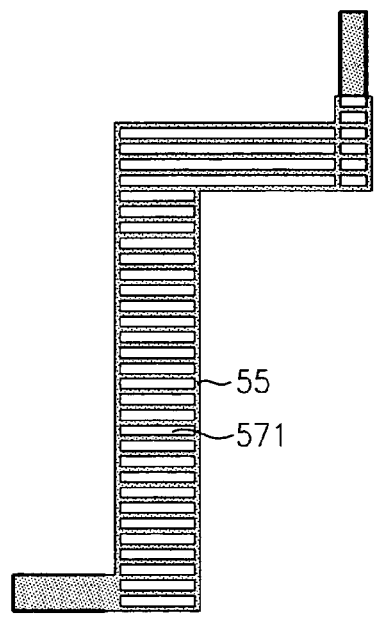
FIG. 19 shows an opening portion of a metal pattern of an LCD according to another embodiment of the present invention.

The conductive layer 55 shown in FIG. 17 has a resistance larger than a conductive layer 55 without an opening portion as shown in FIG. 18, but smaller than a conductive layer 55 with a plurality of slits elongated perpendicular to the signal transmission direction as shown in FIG. 19. It is because the resistance of the conductive layer 55 is proportional to an area normal to a current flow. For example, the conductive layer 55 shown in FIG. 19 has a cross section determined by two edge narrow lines, while the conductive layer 55 shown in FIG. 17 has a cross section determined by several narrow lines.

Accordingly, the provision of slits elongated along the signal transmission minimizes the increase of the resistance and enhances the hardening of a sealant.

A connection 55a preferably made of the same material as the conductive layer 55 is preferably provided for repairing the disconnection of the narrow lines. The connection 55a connects the narrow lines at the middle portions thereof to prevent the increase of the resistance when at least one of the narrow lines is disconnected.

In the meantime, the conductive layer 55 is preferably made of low resistivity material and preferably has large thickness for reducing the resistance as described above.

Figure 20:
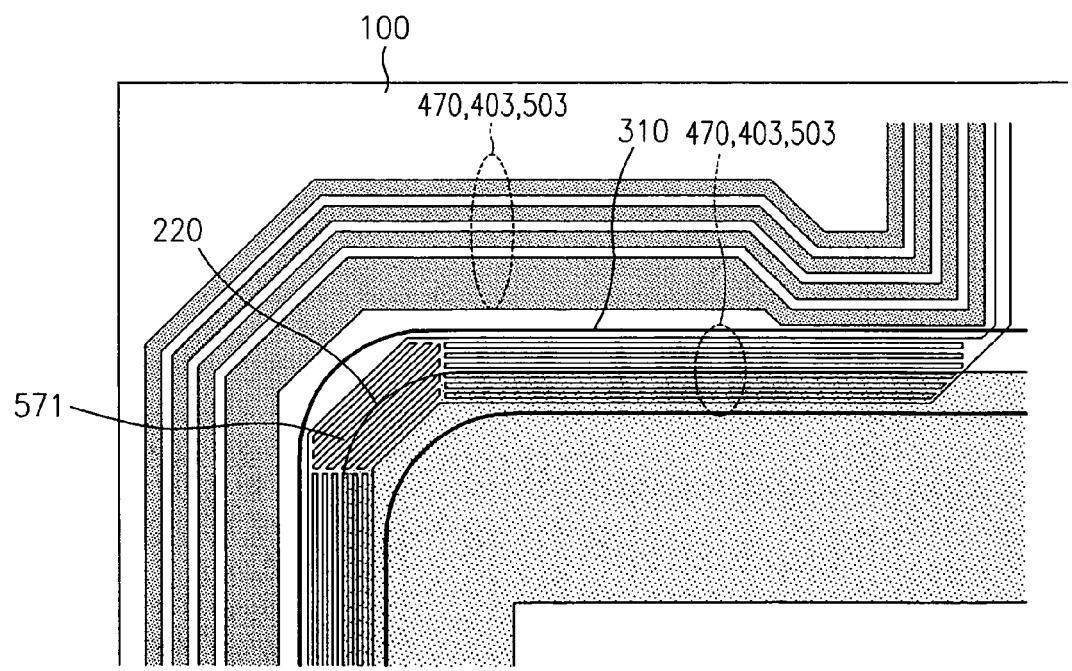
FIG. 20 is a partial layout view of an LCD according to another embodiment of the present invention.

FIG. 20 is a partial layout view of an LCD according to a fifth embodiment of the present invention.

Referring to FIG. 20, a conductive layer 55 including at least one of a connector 470, a plurality of signal lines 403 for gate driving circuits, and a plurality of signal lines 503 for data driving circuits has an opening portion 571 at an overlap between a sealant 310 and a black matrix 220 for transmitting UV light to harden the sealant 310.

As described above, the conductive layer 55 may be located out of the sealant 310 for enhancing the hardening of the sealant.

As described above, an LCD according to embodiments of the present invention includes a light blocking tape attached near a polarizer on an outer surface of a liquid crystal panel assembly and a light blocking area formed at a protection sheet on an area between the polarizer and the light blocking tape. The light blocking area blocks the light passing through the area between the polarizer and the light blocking tape to prevent light leakage on a peripheral area, thereby improving display characteristics of the LCD.

In addition, an LCD and a manufacturing method thereof provide an opening or a transparent conductive film at a metal pattern overlapping a black matrix such that the opening or the conductive film transmits UV light to harden a sealant. Furthermore, the UV light is obliquely directed to be reflected by a reflector such that it reaches the sealant, or it is directed from both outer surfaces of substrates to harden the sealant.

Moreover, the opening elongates along the signal transmission to minimize the increase of the resistance.

Although embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A liquid crystal display comprising:
a first panel including a conductive member including a light transmitting portion;
a second panel spaced apart from the first panel by a predetermined gap and including a black matrix;
a sealant disposed between the first panel and the second panel and overlapping the black matrix, the light transmitting portion disposed at the overlapping;
a liquid crystal layer filled in the gap between the first panel and the second panel, and enclosed by the sealant;
a gate driving circuit sending signals to the first panel; and
a data driving circuit sending signals to the first panel,
wherein the conductive member comprises a connector for signal transmission between the data driving circuit and the gate driving circuit.

2. The liquid crystal display of claim 1, wherein the light transmitting portion includes at least one transparent area and at least one opaque area.

3. The liquid crystal display of claim 2, wherein the at least transparent area is an opening type.

4. The liquid crystal display of claim 3, wherein the at least transparent area includes a plurality of slits or a lattice pattern.

5. The liquid crystal display of claim 2, wherein the at least transparent area comprises a transparent conductive material.

6. The liquid crystal display of claim 2, wherein the at least transparent area occupies about 20% or more of an area occupied by the light transmitting portion.

7. The liquid crystal display of claim 1, wherein the first panel further comprises a plurality of pixel electrodes and a plurality of storage electrode lines overlapping the pixel electrodes, and the conductive member further comprises a storage electrode connection connected to the storage electrode lines and overlapping the sealant and the black matrix.

8. The liquid crystal display of claim 1, wherein the second panel further comprises a common electrode, and the conductive member further comprises a common electrode connection connected to the common electrode and overlapping the sealant and the black matrix.

9. The liquid crystal display of claim 1, wherein the first panel further comprises a plurality of thin film transistors controlled by the gate driving circuit and the conductive member further comprises a signal line for signal transmission with the gate driving circuit and overlapping the sealant and the black matrix.

10. The liquid crystal display of claim 1, wherein the first panel further comprises a plurality of pixel electrodes supplied with voltages from the data driving circuit and the conductive member further comprises a signal line for signal transmission with the data driving circuit and overlapping the sealant and the black matrix.

11. The liquid crystal display of claim 1, wherein the gate driving circuit is mounted on the first panel, the data driving circuit is formed on a data PCB and the data PCB is connected to the first panel, and the conductive member. further comprises a first signal line for giving a signal to or receiving a signal from the gate driving circuit.

12. The liquid crystal display of claim 11, wherein the conductive member further comprises a second signal line for giving a signal to or receiving a signal from the data driving circuit.

13. The liquid crystal display of claim 1, wherein the second panel comprises a common electrode and the conductive member further comprises a common electrode connection connected to the common electrode and located out of the sealant.

14. A liquid crystal display comprising:
a first panel including a conductive member including a light transmitting portion;
a second panel spaced apart from the first panel by a predetermined gap and including a black matrix;
a sealant disposed between the first panel and the second panel and overlapping the black matrix, the light transmitting portion disposed at the overlapping;
a liquid crystal layer filled in the gap between the first panel and the second panel, and enclosed by the sealant; and
a gate PCB and a data PCB for supplying signals to the first and the second panels,
wherein the conductive member comprises a connector transmitting signals between the data PCB and the gate PCB and overlapping the sealant and the black matrix.

15. A liquid crystal display comprising:
a first panel including a conductive member including a light transmitting portion;
a second panel spaced apart from the first panel by a predetermined gap and including a black matrix;
a sealant disposed between the first panel and the second panel and overlapping the black matrix, the light transmitting portion disposed at the overlapping;
a liquid crystal layer filled in the gap between the first panel and the second panel, and enclosed by the sealant;
a data driving circuit for generating data voltages;
a gate driving circuit for generating gate signals; and
a data PCB and a gate PCB for controlling the data driving circuit and the gate driving circuit,
wherein the first panel further comprises a plurality of pixel electrodes and a plurality of thin film transistors for transmitting the data voltages to the pixel electrodes in response to the gate signals, the conductive member comprises a connector for signal transmission between the data PCB and the gate PCB, a first signal line for signal transmission with the gate driving circuit, and a second signal line for signal transmission with the data driving circuit, and the connector and the first and the second signal lines are located in and out of the sealant.

16. A method of manufacturing a liquid crystal display, the method comprising:
forming a conductive member including a light transmissive portion on a first substrate;
forming a black matrix on a second substrate;
forming a sealant overlapping the light transmissive portion;
forming a liquid crystal layer enclosed by the sealant;
adhering the second substrate to the first substrate using the sealant; and
hardening the sealant to combine the first substrate and the second substrate,
wherein the conductive member comprises a connector for signal transmission between a data driving circuit and a gate driving circuit.

17. The method of claim 16, wherein the sealant overlaps the black matrix in part.

18. The method of claim 17, wherein the hardening comprises:
disposing a reflector located opposite the second substrate with respect to the first substrate; and
directing light from the second substrate to the sealant to be hardened.

19. The method of claim 18, wherein the light is obliquely directed to the first and the second substrates.

20. The method of claim 17, wherein the hardening comprises:
directing light from the first and the second substrates to the sealant to be hardened.

21. The method of claim 17, wherein the hardening comprises:
directing light from the first substrate to the sealant to be hardened.

22. The method of claim 21, wherein the hardening further comprises:
reversing relative positions of the first and the second substrates before the direction of light.

23. A liquid crystal display comprising:
a first panel including a conductive layer;
a second panel spaced apart from the first panel by a predetermined gap and including a black matrix;
a sealant disposed between the first panel and the second panel and overlapping the black matrix; and
a liquid crystal layer filled in the gap between the first panel and the second panel and enclosed by the sealant,
wherein the conductive layer has a plurality of slits located at the overlapping and elongated along a signal transmission of the conductive layer, and the conductive layer comprises a connector for signal transmission between a data driving circuit and a gate driving circuit.

24. The liquid crystal display of claim 23, wherein the conductive layer extends along the signal transmission.

25. The liquid crystal display of claim 24, wherein the slits form at least two rows along the signal transmission.

26. The liquid crystal display of claim 25, wherein width of the slits is equal to or larger than distance between the slits.

* * * * *

UNITED STATES PATENT AND TRADEMARK OFFICE
CERTIFICATE OF CORRECTION

| | | |
|---|---|---|
| PATENT NO. | : 7,436,473 B2 | Page 1 of 1 |
| APPLICATION NO. | : 10/723178 | |
| DATED | : October 14, 2008 | |
| INVENTOR(S) | : Hyo-Hak Nam et al. | |

It is certified that error appears in the above-identified patent and that said Letters Patent is hereby corrected as shown below:

On the Title page,

Add under (56) References Cited, FOREIGN PATENT DOCUMENTS:

JP     2002-311439    October 23, 2002
KR    1020000017061  March 25, 2000

Signed and Sealed this

Fourteenth Day of July, 2009

JOHN DOLL
*Acting Director of the United States Patent and Trademark Office*